April 28, 1953     M. R. NELSON ET AL     2,636,725
FLAME HARDENING APPARATUS

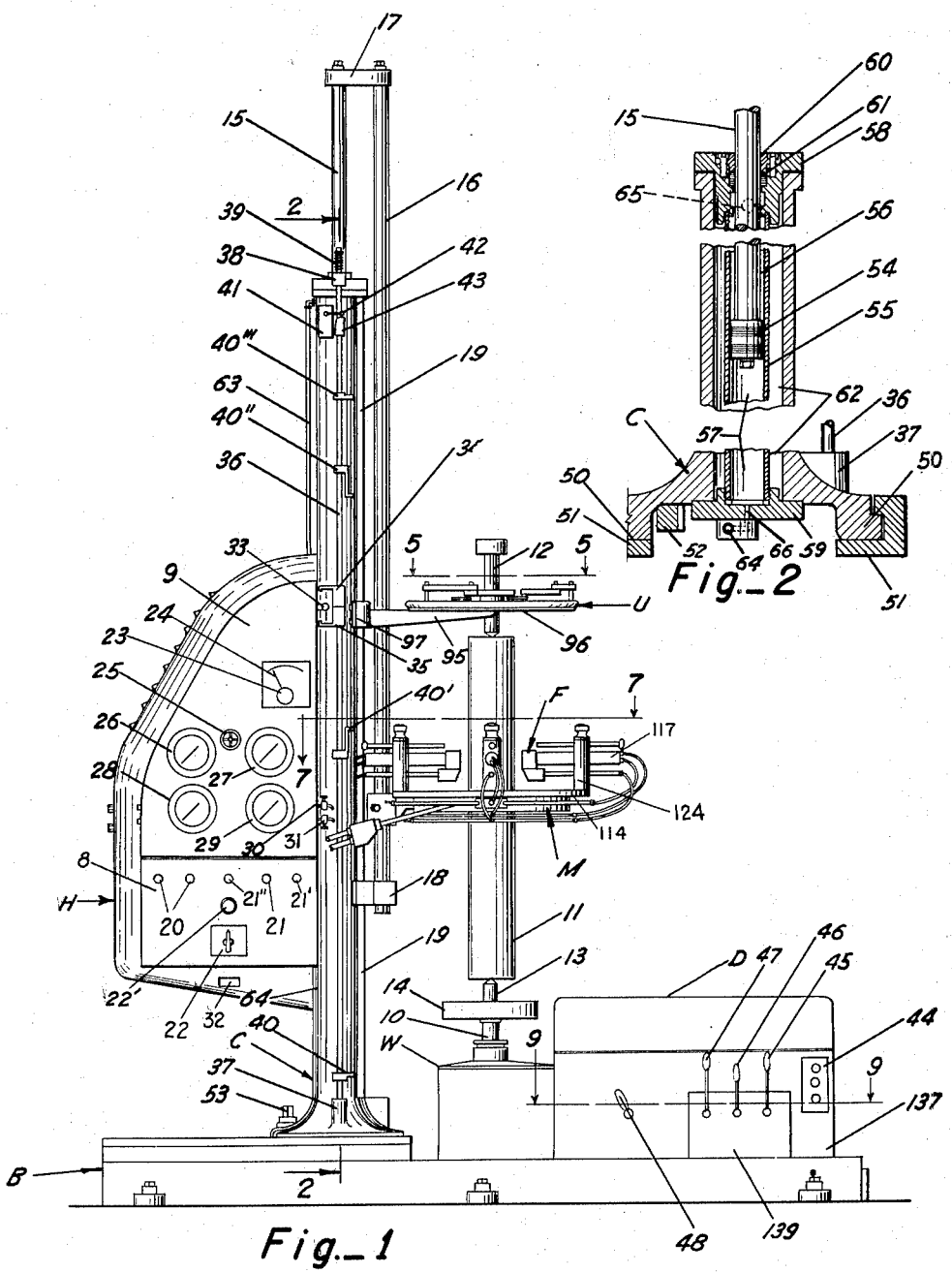

Filed Oct. 6, 1947     10 Sheets-Sheet 2

INVENTORS
MANLEY R. NELSON
BY RICHARD S. SHEEHAN

ATTORNEY

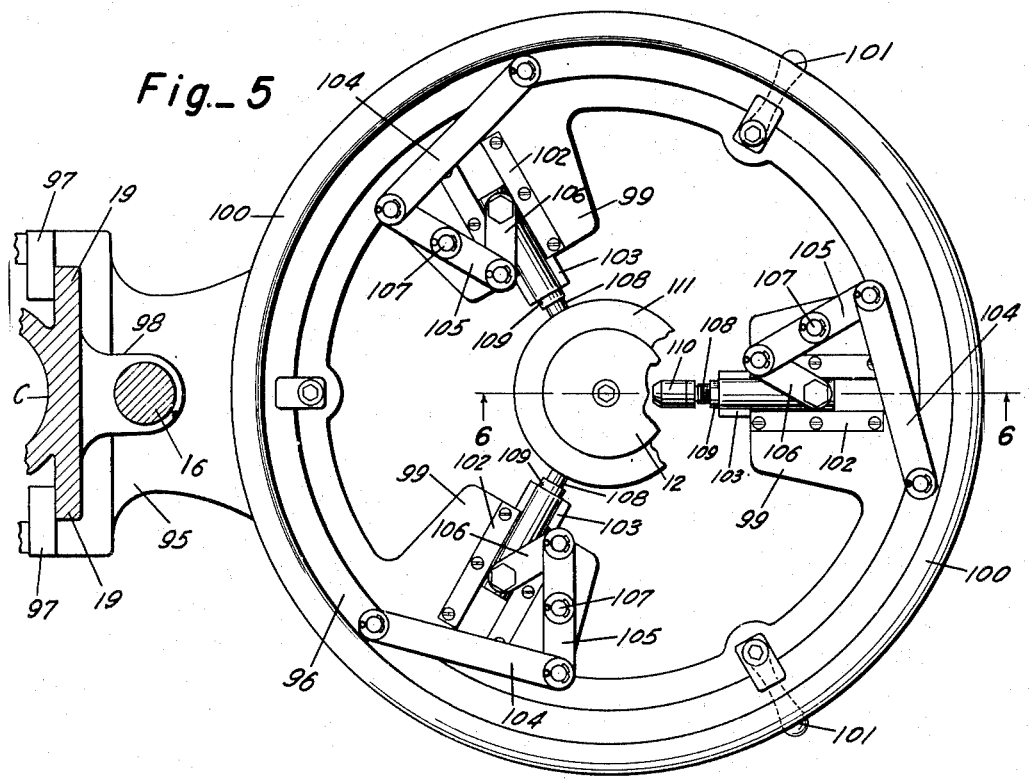

April 28, 1953 M. R. NELSON ET AL 2,636,725
FLAME HARDENING APPARATUS
Filed Oct. 6, 1947 10 Sheets-Sheet 4
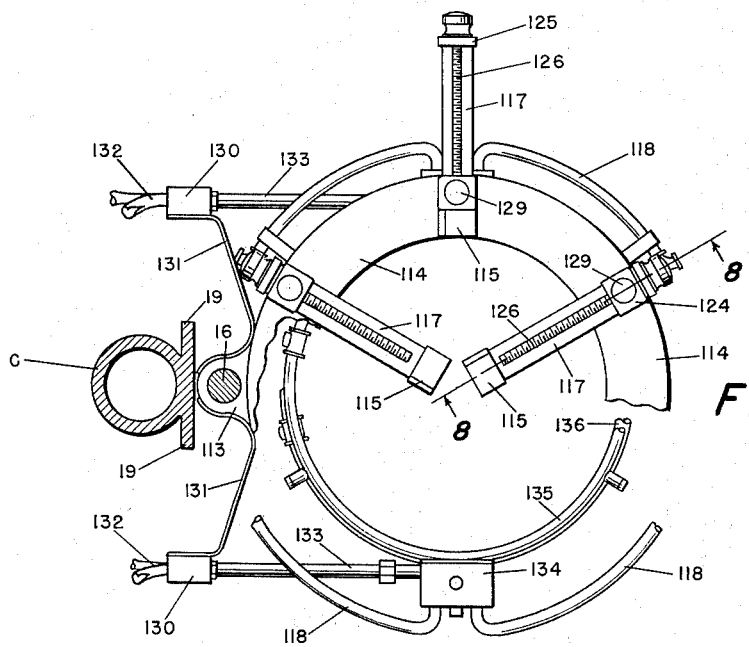
Fig._7
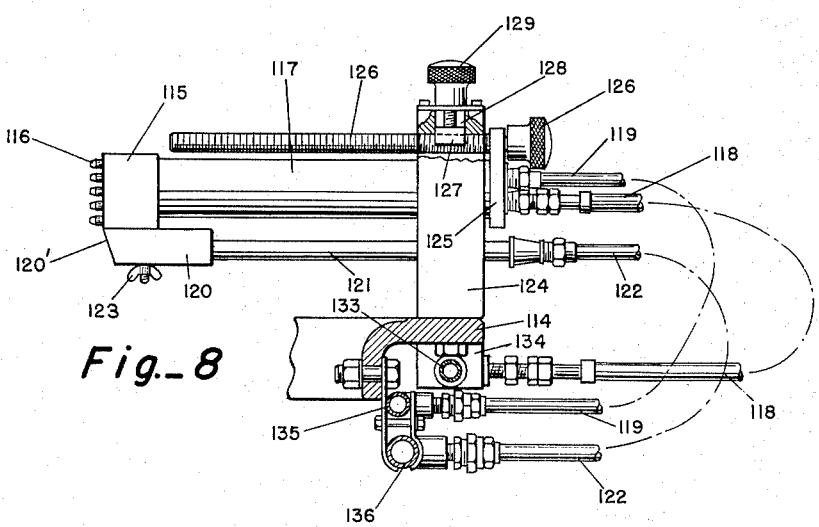
Fig._8
INVENTORS
MANLEY R. NELSON
BY RICHARD S. SHEEHAN
ATTORNEY

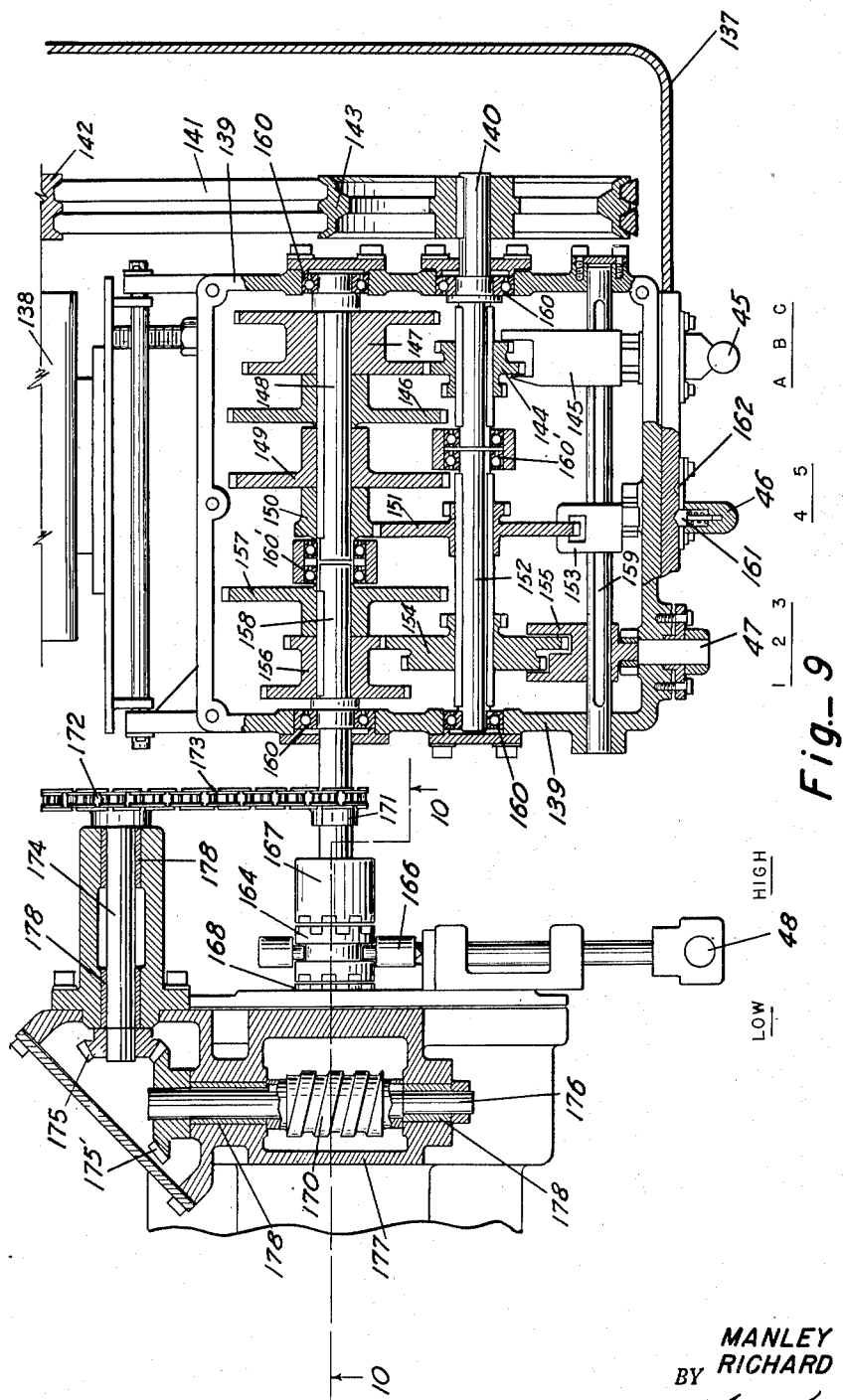

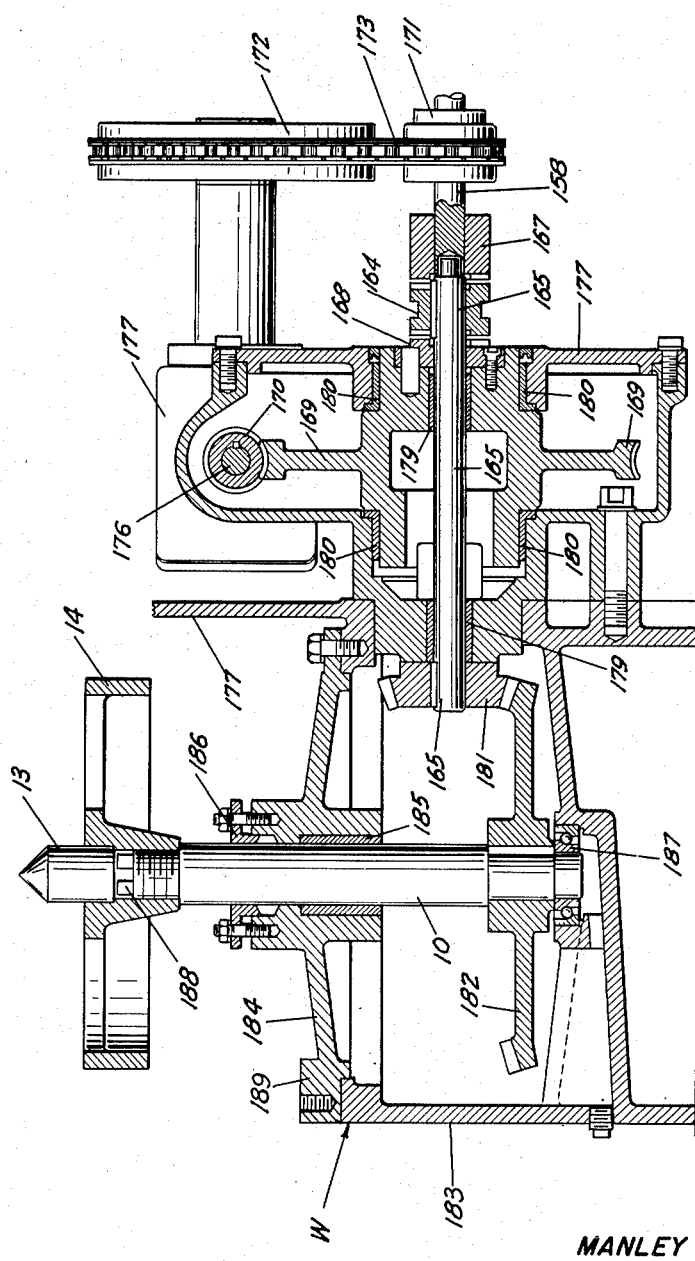

April 28, 1953 M. R. NELSON ET AL 2,636,725
FLAME HARDENING APPARATUS
Filed Oct. 6, 1947 10 Sheets-Sheet 7

INVENTORS
MANLEY R. NELSON
BY RICHARD S. SHEEHAN
ATTORNEY

INVENTORS
MANLEY R. NELSON
RICHARD S. SHEEHAN
ATTORNEY

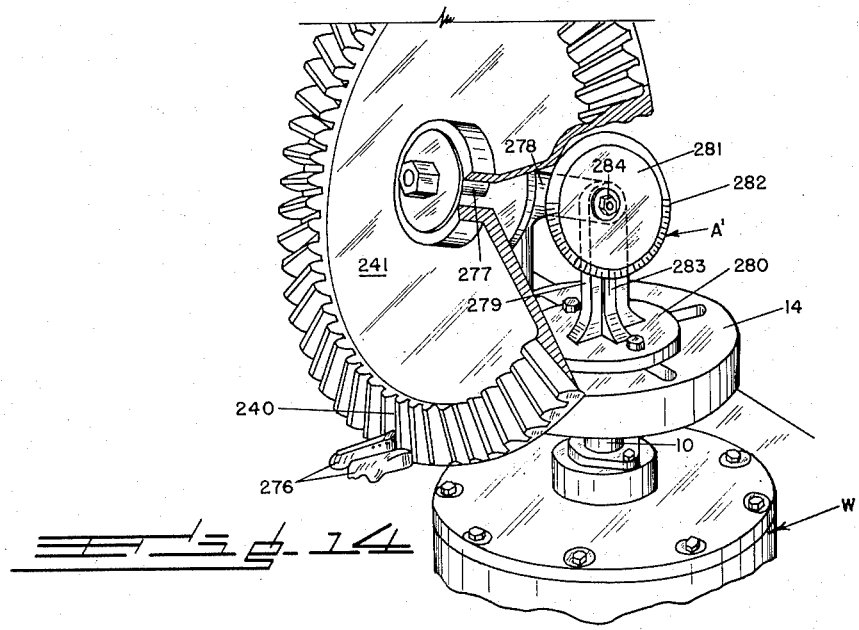
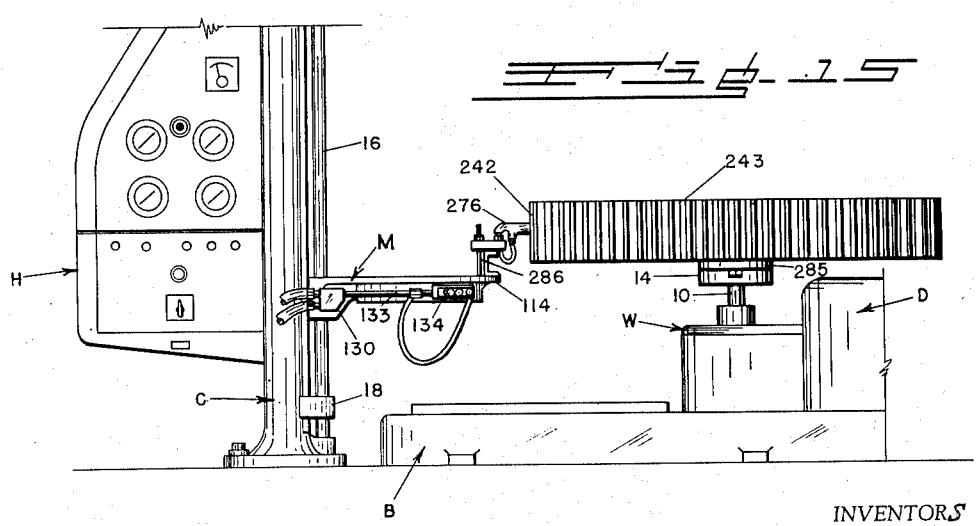

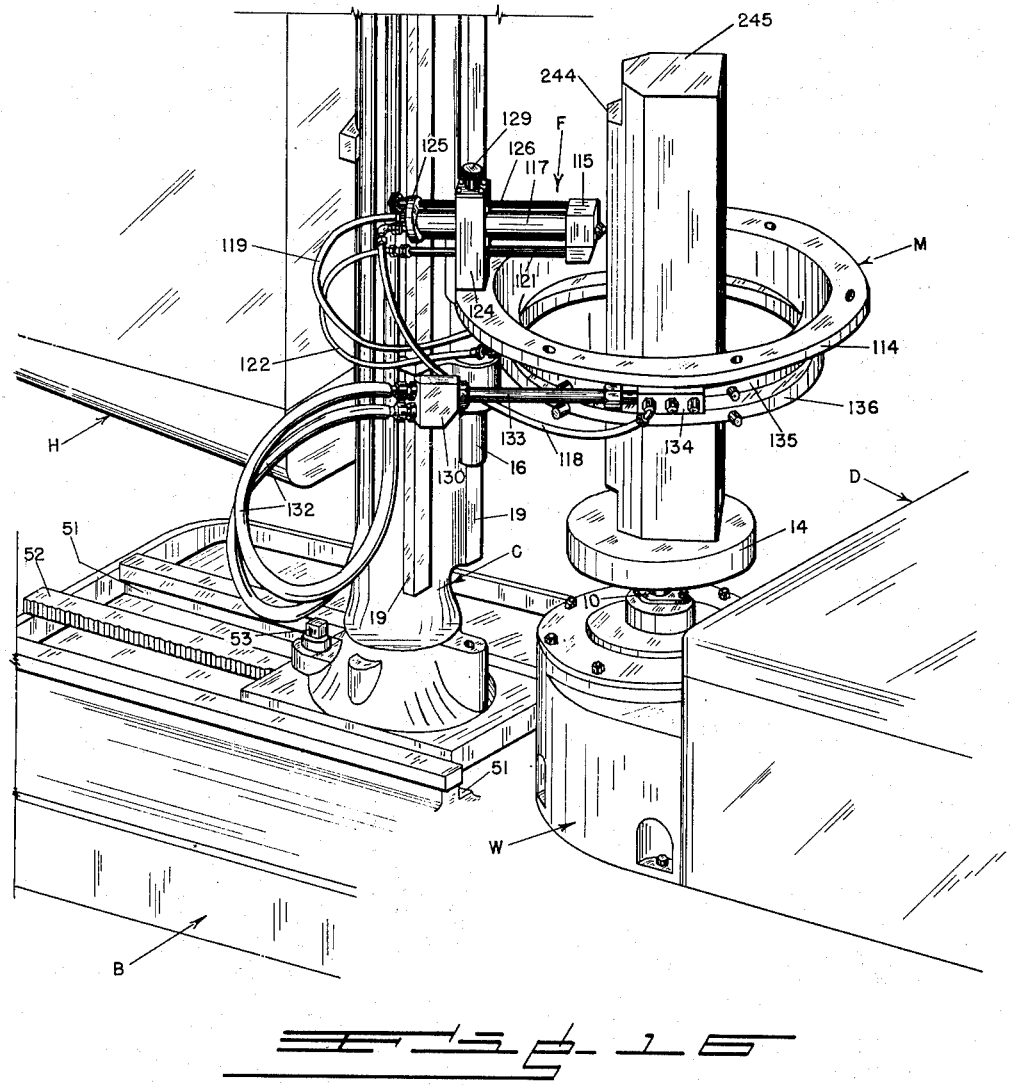

Patented Apr. 28, 1953

2,636,725

UNITED STATES PATENT OFFICE 2,636,725

FLAME HARDENING APPARATUS

Manley R. Nelson and Richard S. Sheehan, Denver, Colo.

Application October 6, 1947, Serial No. 778,106

2 Claims. (Cl. 266—4)

This invention relates to flame hardening methods and apparatus, and more particularly to a universal flame hardening machine.

In flame hardening, a high temperature heating flame, preferably an oxy-acetylene flame, is utilized to heat selected surface portions of a hardenable metal object (usually steel) to a desired depth and to a temperature above the critical, so that upon cooling at a sufficiently rapid rate a hardened case is produced. Except in the case of air-hardening steel, a quenching medium, usually water, is directed against the heated surface to effect cooling at an appropriate rate.

There are four general methods of application of flame hardening, the first and simplest being "spot" hardening, in which a single flame or group of flames is applied to a selected surface portion of a stationary object until the area is heated to the requisite temperature and depth, whereupon the flame is removed and the quench applied. In a second method, termed "discontinuous," a flame or group of flames of less extent than the total area is employed, and either the flame or the object, or both, are moved, such as to and fro or by rotation, until the total area is heated to the desired temperature and depth, whereupon the flame is moved away or extinguished and the quench applied. The "discontinuous" method is used in flame hardening objects such as rail ends, crankshaft bearings, valve faces, and the like, and also in the spin hardening of small gears.

In a third method, termed "progressive," a flame or group of flames is used in heating successive surface portions of the object to the desired temperature and depth, followed by the quenching jets. The heating flame or flames and quenching jets are usually maintained a constant distance apart, and either the object may be moved past the flames and quenching jets, or the flames and quenching jets may be moved along the object. The progressive method is normally used in hardening long bearing areas, as on lathe-bed ways, guide rails and the like, or relatively narrow or irregular surfaces, such as cams, sheave and pulley grooves, and the like.

In a fourth method, termed "combination," a relative movement in two directions between the heating flames and quenching jets, on the one hand, and the object, on the other, is employed, the operation being otherwise similar to the progressive method, since the heating flames and quenching jets are normally maintained a fixed distance apart. The combination method is used principally in hardening objects of circular cross-section, such as rolls, cylinders and shafts, the object being rotated within a ring or group of heating flames and spaced quenching jets, while the object—or preferably, the heating flames and quenching jets, are moved axially of the object. This produces an even heating effect, with the result that a more uniform thickness of case can be secured.

An object of this invention is to provide a flame hardening machine which is capable of use in hardening a large variety of objects and parts such as the entire or selected surface portions of cylinders, rolls, and shafts; the teeth of gears (spur, bevel, helical and herringbone), pinions, sprockets, worms and screws; the grooves of sheaves and pulleys; the wearing portions of guide rails, plates, discs, rings, beams, channels, and other surfaces; and many other articles.

Another object of this invention is to provide a flame hardening machine which is capable of carrying out any of the four general methods of application of flame hardening, and primarily adapted to perform the combination and progressive methods.

Among further objects of this invention are to provide a flame hardening machine which is capable of supporting and moving one or more torches and associated quenching devices at a controlled variable speed, with respect to a work piece; to provide such a machine by which the optimum results are insured as far as possible; to provide such a machine on which the work-piece may be mounted for rotation about a vertical axis, with substantially any desired speed of rotation; to provide such a machine which includes a novel centering device for mounting shafts and other round or cylindrical objects; to provide such a machine on which small objects such as pinions and small gears, as well as relatively large objects, such as gears of considerable diameter and large rolls, may be mounted with facility; to provide such a machine in which various phases of control of the hardening operation may be made automatic; to provide such a machine in which any desired number of torches and associated quenching devices may be mounted about a cylindrical object or in a desired relation to the object to be flame hardened; to provide such a machine which includes a novel torch adjustment device; to provide such a machine which includes a novel support and hydraulic drive arrangement for moving the torches and quenching devices; to provide such a machine in which the torches and quenching devices are moved relatively slowly during hardening, but may be returned to initial position, as for the next hardening operation, at a relatively rapid rate; and to provide such a machine in which the control mechanism may be mounted so as to balance the weight of the torch support and centering device.

Among additional objects of this invention are to provide attachments for the machine which will enable different articles, such as bevel gears, herringbone gears or pinions, worms and the like, to be mounted with the axis of the object horizontal or at some other angle to the vertical; to provide such attachments which may readily be attached to and mounted on the machine with a minimum of effort; and to provide a truly universal flame hardening machine which is operable in an effective and efficient manner.

Other objects and the novel features of this invention will become apparent from the following description, taken in connection with the accompanying drawings, in which:

Fig. 1 is a side elevation of a universal flame hardening machine constructed in accordance with this invention, in position for hardening a cylindrical object, such as a roll or shaft;

Fig. 2 is a vertical transverse section, taken through the supporting column of the machine of Fig. 1, along line 2—2 thereof;

Fig. 5 is a top plan view of a novel centering device forming a part of the machine of Fig. 1, and taken along line 5—5 thereof;

Fig. 6 is a partial transverse vertical section, taken along line 6—6 of Fig. 5;

Fig. 7 is a top plan view of a torch supporting ring and associated parts, taken along line 7—7 of Fig. 1, and partly broken away for clarification;

Fig. 8 is a vertical section taken along line 8—8 of Fig. 7, and particularly illustrates a torch adjustment device;

Fig. 9 is a horizontal section taken through the variable speed drive means, along line 9—9 of Fig. 1;

Fig. 10 is a longitudinal vertical section taken through the article support and also through a portion of the variable speed drive means, along line 10—10 of Fig. 9;

Fig. 14 is a partial three dimensional view, illustrating the hardening of a bevel gear by the machine of this invention, and also illustrates an attachment for mounting the gear, the gear being partly broken away for clarification;

Fig. 15 is a partial side elevation illustrating the hardening of a large spur gear by the machine of this invention;

Fig. 16 is a partial three dimensional view illustrating the hardening of a guide rail by the machine of this invention.

Figures 3, 4:
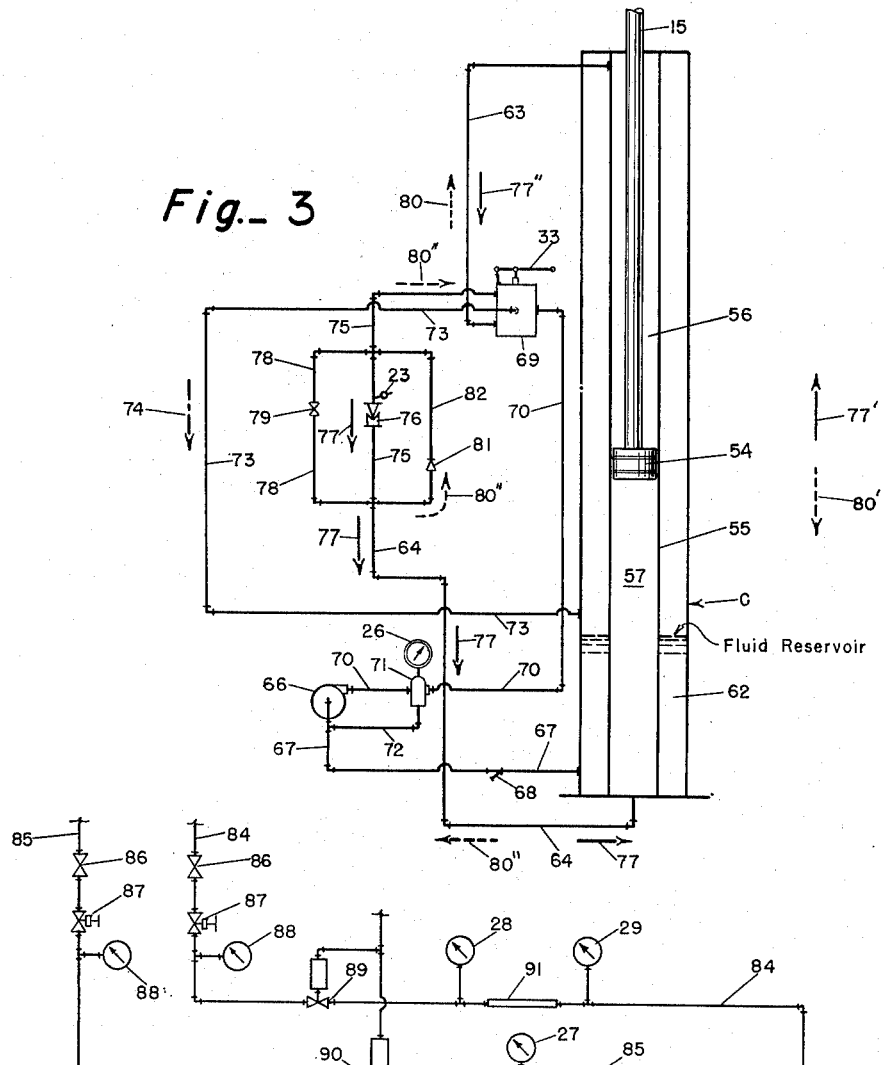
Fig. 3 is a diagram of the hydraulic system of the machine of Fig. 1.
Fig. 4 is a diagram of the oxygen and acetylene supply and control system of the machine of Fig. 1.

As shown generally in Fig. 1, the universal flame hardening machine of this invention may comprise an upright column C, mounted for longitudinal adjustment along a base B, on which is also mounted drive means D for turning a rotating shaft 10 of a work support W and thereby rotate the article to be hardened, such as a roll or short shaft 11. The drive means D is preferably constructed to provide adjustment of the speed of rotation of shaft 10, as in a manner explained later. The column C extends upwardly in a vertical direction and carries a movable support M for flame hardening means F, the latter being adapted to heat and quench successive portions of the surface of roll 11 during rotation of the roll and upward movement of the flame hardening means F. Column C also carries an upper support U, which is adjustable to different vertical positions, but normally remains stationary during each hardening operation. Upper support U includes a novel alignment device, described in detail later, which is adapted to maintain an upper center 12 in alignment with a lower center 13, with the roll or shaft 11 mounted between the centers 12 and 13. Lower center 13 is mounted on a face plate 14, which in turn is attached to the upper end of rotating shaft 10.

The movable support M is moved upwardly and downwardly by suitable means, such as hydraulically actuated means which includes an interior piston rod 15 and an exterior rod 16, connected together at their upper ends by a block 17. Interior rod 15 extends centrally within column C, moving upwardly and downwardly therein, while exterior rod 16 moves upwardly and downwardly with a similar motion transmitted thereto through block 17, and is guided at the lower end by a slide 18 adapted to move along vertical ways 19, formed on column C. Movable support M is mounted on exterior rod 16, while upper support U is mounted on ways 19, each being adjustable to any desired position upwardly or downwardly thereof. Upper support U is constructed, and the parts of flame hardening means F are preferably so positioned, that sufficient clearance is obtained for hardening to the upper end of article 11, as will also be apparent from later description. Ordinarily, the upper support U is positioned just above the upper end of the article, as shown, but when a shaft to be hardened, for instance, is longer than can be accommodated with upper support U in its uppermost position, upper center 12 is removed, and the shaft is merely extended through the upper support U. The alignment device of support U operates equally well in maintaining upper center 12 or the article to be hardened in alignment, even though the latter rotates, as explained later.

Mounted on the opposite side of column C from supports M and U, to counterbalance the weight of the supports M and U and the parts mounted thereon, is a control housing H, in which is installed the majority of the control valves, regulators, electrical and hydraulic control mechanism, and associated parts. The housing H may be divided into a lower section 8 and an upper section 9, the former being adapted to enclose the electrical control parts, and the latter the oxygen, acetylene, and hydraulic control parts. The housing H may, of course, be unitary, but the division indicated permits separate assembly of lower section 8 and its subsequent attachment as a unit to the upper section 9. The various valves, regulators and the like installed within control housing H are generally conventional in character, and for more efficient operation, certain parts are visible or accessible from one side of the machine, as by being mounted on the exterior of the control housing H. Such parts installed in the lower section 8 include push buttons 20 for the switch which starts and stops the motor driving a pump for supplying hydraulic fluid under pressure (the pump being installed in upper section 9); push buttons 21 and 21' for starting and stopping the flow of oxygen and acetylene to flame hardening means F; a push button 21'' for changing the operation from hand control to control by an automatic timer; a selector 22 for setting the timer; and an incandescent lamp 22', which is lit during the time interval for which the timer is set. Such parts installed in upper section 9 include a by-pass valve control handle 23 and associated speed indicating pointer 24, the by-pass valve regulating the flow of hydraulic fluid and thereby controlling the rate of upward movement of movable support M and the flame hardening means F carried thereby; a control wheel 25 for hydraulic by-pass valve, which is normally closed; a hydraulic pressure gage 26; an acetylene pressure gage 27; and oxygen pressure gages 28 and 29, respectively, indicating the oxygen pressure before and after passage through a metering orifice. The acetylene further passes to a needle valve 30, and the oxygen to a needle valve 31, disposed in an accessible position for adjustment, when desired. Also, an electrical outlet receptacle 32 may be provided on lower section 8, for attachment of a cord leading to a portable control switch.

A control handle 33 of a four-way hydraulic control valve also extends from the control housing H, in position to be actuated by stops 34 and 35, mounted in opposed position on a control rod 36. Control rod 36 extends alongside column C, the lower end of the control rod being received in a hole provided in a boss 37 adjacent the bottom of column C. The upper end of the control rod extends through a bracket 38 at the upper end of column C, a spring 39 being provided above bracket 38 to maintain the control rod in a normal position. Control rod 36 is moved at the upper or lower end of traverse by engagement of slide 18 with stops 40, 40', 40'' or 40''', which are adjustable in position along control rod 36. Stops 40 and 40' are used as the limit stops for operations involving traverse of an article having a length such as the shaft 11 shown in Fig. 1, but stops 40'' and 40''' may also be used. Thus, the traverse may be between stops 40 and 40', as shown, or between stops 40 and 40'' or 40''', in the latter instance stop 40' being adjusted to a pivotal position facing control housing H, for instance, to prevent engagement by slide 18, stop 40'' also being similarly adjusted when desired. Or, the traverse may be between stops 40' and 40'' or 40''' or between stops 40'' and 40'''. In general, stops 40'' and 40''' are provided above stops 34 and 35 to facilitate adjustment of the machine, obviating the removal of one or both stops 40 or 40', below the central stops 34 and 35, when one or both limits of traverse lie along the upper portion of rod 36.

In the position shown in Fig. 1, hydraulic handle 33 is in a center or neutral position, and to start the machine upwardly, control handle 33 is moved downwardly manually, but when the slide 18 reaches stop 40', at the upper end of traverse, control rod 36 will be moved upwardly and thereby cause stop 35 to move handle 33 upwardly to the neutral position, thereby stopping upward movement. To start the downward movement, control handle 33 is moved to upper position, and when slide 18 reaches lower stop 40, at the lower end of traverse, control rod 36 is moved downwardly to cause stop 34 to move handle 33 downwardly to the neutral position again, thereby stopping the traverse movement. The normal operations during use of this machine are sufficiently long, so that manual movement of the control handle 33 at the beginning of each traverse is satisfactory, but it will be understood that more competely automatic operation is entirely feasible.

The heating flames may be turned off automatically, simultaneously or prior to end of upward traverse, by a limit switch 41 mounted at the upper end of column C and having an actuating arm 42 adapted to be engaged by a stop 43 attached to control rod 36. Thus, when the upper end of traverse is reached, and the control rod is moved upwardly, limit switch 41 will be actuated to shut off the heating flames.

The drive means D is also provided with exterior controls, including a push button switch 44, for starting and stopping the drive means motor; three gear adjustment levers 45, 46 and 47, respectively; and a clutch operating handle 48 which also is shifted to provide additional speed selection. As will be explained in detail later, gear shifting levers 45, 46, and 47, and clutch handle 48 are moved to different positions, in accordance with the speed of rotation of work shaft 10 desired. It is sufficient for the present to state that the speeds which may be selected extend over a greater range than required for known flame hardening requirements. In general, the required rate of rotation of the article is determined by its diameter, since the peripheral speed is usually the determining factor. Thus, for articles having a relatively small diameter, a greater rate of rotation is normally required than for larger articles.

Figure 12:
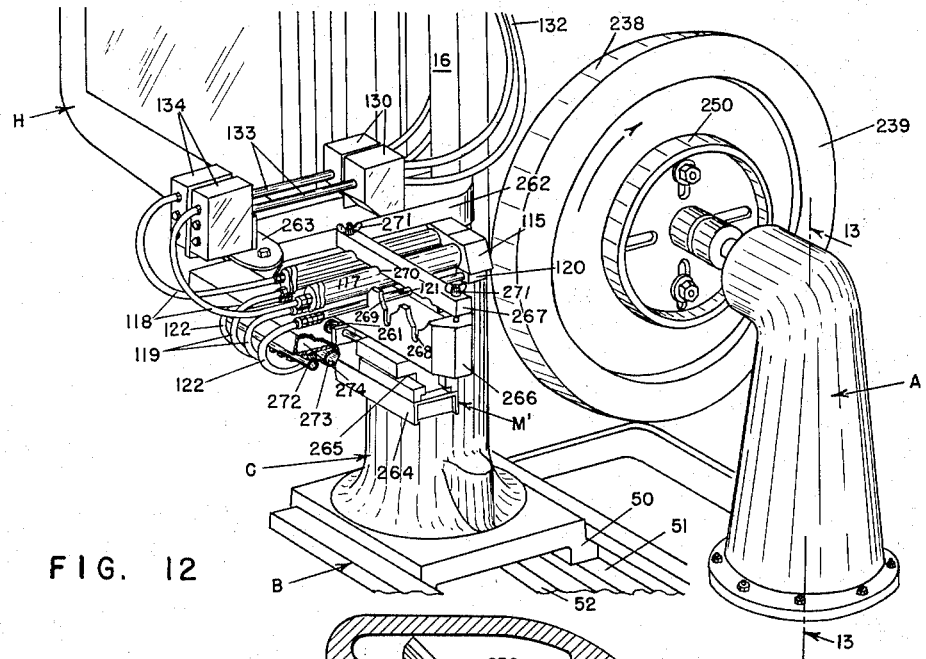
Fig. 12 is a three dimensional view of the hardening of a roller by the machine of this invention, and also illustrates an angle drive attachment for supporting the article for rotation about a horizontal axis.

For hardening cylindrical articles, not excessive in diameter, the column C is left in the position of Fig. 1, but for hardening other articles, the column C may be adjusted to a different position along base B, as in Fig. 12, or even removed therefrom, as in Fig. 15. For such adjustment, and as shown in Figs. 1, 2, 12 and 16, the column C is provided at its lower end with flanges 50, adapted to slide along ways 51 on base B during adjustment. The longitudinal position of the column C is adjusted by a pinion adapted to engage a rack 52, and turned by means of an adjusting stud 53.

The hydraulically actuated system for effecting upward and downward traverse includes the parts within column C, and also other parts in control housing H, as shown diagrammatically in Fig. 3. As shown in Fig. 2, the lower end of rod 15 is provided with a piston 54, which divides a pressure tube or cylinder 55 into an upper chamber 56 and a lower chamber 57, so that appropriate hydraulic pressure in chamber 57 will cause the flame hardening means F to move upwardly, and in chamber 56, downwardly. Cylinder 55 preferably has relatively exact dimensions to accommodate piston 54, being formed of drawn tubing or the like, and, as in Fig. 2, is connected in a fluid tight manner at opposite ends with an upper cap 58 and a lower cap 59 of column C, the former being provided with a gland 60 and packing 61 to accommodate and provide a seal for rod 15. Since cylinder 55 is mounted within column C, which may be formed by casting or the like, the latter need not have nearly as accurate dimensions, and machining expenses are reduced. In addition, a fluid compartment or reservoir 62 is provided within column C outside cylinder 55. As in Figs. 1 and 2, the hydraulic fluid is transmitted to and from chambers 56 and 57 by pipes 63 and 64, communicating respectively through a connection 65 in upper cap 58 and a connecting passage 66 in lower cap 59.

The hydraulic system, as indicated previously, is illustrated diagrammatically in Fig. 3, and includes a pump 66 supplied with fluid from reservoir 62, as through an intake line 67, provided with a strainer 68. Pump 66 supplies fluid at a predetermined pressure to a four-way valve 69, through a pump discharge or pressure line 70, excess pressure to valve 69 being prevented by a relief valve 71, installed in pump discharge line 70 and connected by a relief pipe 72 with pump intake line 67. Hydraulic pressure gage 26 may also be connected to pump discharge line 70 at relief valve 71, as shown. Four-way valve 69 is conventional, being movable by handle 33 to three different positions, a central or "neutral" position, an upper or "downward movement" position, and a lower or "upward movement" position. When handle 33 is in the central or neutral position, pressure line 70 is connected with a drain pipe 73, leading to reservoir 62, so that the entire fluid flow supplied by pump 67 passes to reservoir 62, as indicated by the dot-dash arrow 74. The remaining connections of valve 69 are sealed, so that piston 54 remains in position in column C, and there is no movement of exterior rod 16 and movable support M. When the handle 33 is moved downwardly, i. e., for upward movement of piston 54, pressure line 70 is connected with pipe 64, through a regulating line 75 containing a regulator valve 76, controlled by handle 23, to supply fluid under pressure to lower chamber 57, the flow of fluid in lines 75 and 64 being in the direction of the solid arrows 77. Thus, piston 54 will tend to be moved upwardly, in the direction of solid arrow 77'. At the same time, fluid forced out of upper chamber 56 passes through pipe 63, in the direction of the solid arrow 77'', to four-way valve 69, and thence through drain pipe 73 for discharge to reservoir 62, the flow through drain pipe 73 being always in the direction of dotted arrow 74. The speed of upward travel of piston 54 and movable support M is determined by the setting of regulator valve 76, which may be set for any position from fully closed—at which the rate of upward travel will be zero—to a maximum rate of travel.

For quick adjustment to a maximum rate of upward travel, or to permit regulating valve 76 to remain at a specific adjustment, a normally closed globe valve 78, controlled by handle 25 and installed in a by-pass line 79, may be opened. By-pass globe valve 78, or other manually operated valve, may be used in bringing the quenching jets up rapidly at the end of upward traverse, after the heating flames are shut off automatically; in bringing the quench rapidly into position after heating in a spin hardening operation; and for other purposes, such as when adjusting the speed of upward traverse manually, as when testing the position of stops 34, 35, 40, 40', 40'', 40''', and/or 43.

When handle 33 of four-way valve 69 is moved to an upper position, i. e., for downward movement of piston 54, pressure line 70 is connected with pipe 63, the flow to upper chamber 56 being in the direction of dotted arrow 80 and the movement of piston 54 being in the direction of dotted arrow 80'. At the same time, fluid forced out of lower chamber 57 will pass through pipe 64, in the direction of dotted arrow 80'', through a check valve 81 in a line 82 by-passing regulating valve 76, and thence to four-way valve 69. In this position of four-way valve 69, line 75 is connected with drain line 73, the flow through drain line 73 to reservoir 62 being always in the direction of dotted arrow 74, as indicated previously.

The oxygen and acetylene supply means, including the parts installed in control housing H, may be constructed as illustrated diagrammatically in Fig. 4. Thus, an oxygen supply line 84 and an acetylene line 85 may be provided with shut off valves 86, regulator valves 87, and pressure gages 88, these being located exteriorly of the housing H. Inside housing H, the oxygen and acetylene lines are equipped with solenoid operated valves 89 and 90, respectively, while a metering orifice 91 is provided in oxygen line 84. Oxygen gages 28 and 29 and acetylene gage 27 are visible from the exterior of housing H, as indicated previously. Oxygen line 84 leads to a manifold 92, supplying oxygen to the flame hardening means F (described in greater detail later) through oxygen valves 31, and the acetylene supply line 85 leads to a manifold 93, similarly supplying acetylene to the flame hardening means F through acetylene valves 30.

The upper support U includes a novel alignment device, as illustrated in Figs. 1, 5, and 6. The support U includes a bracket 95 formed with a ring 96 at its outer end and at its inner end provided with clamps 97 for attachment to ways 19 of column C. Bracket 95 is also provided with an aperture 98 adjacent ways 19 to accommodate exterior rod 16. Ring 96 is provided with a series of equally spaced, inwardly extending projections 99, such as three, while a handwheel 100 is mounted on ring 96 for rotational movement, being adapted to be clamped in any specific position by clamps 101. A radial guide-way 102, for a slide 103, is mounted on each projection 99, slides 103 being moved inwardly or outwardly by turning handwheel 100. The slides 103 are actuated through a suitable linkage which may consist of an outer link 104, pivotally attached at opposite ends to handwheel 100 and a center link 105, and an inner link 106, pivotally attached at opposite ends to center link 105 and slide 103. Center link 105 is pivotally mounted centrally thereof on a stud 107, in turn mounted on projection 99. As will be evident, rotation of handwheel 100 will move slides 99 inwardly or outwardly, dependent upon the direction of rotation, whether clockwise or counter-clockwise, respectively, as viewed in Fig. 5.

Each slide 103 is interiorly threaded to receive an adjusting screw 108, adapted to be locked in position by a lock nut 109, and carrying at its inner end a roller 110. As in Fig. 6, the upper center 12 may be mounted in a collar 111 which is adapted to rotate on rollers 110, during rotation of the article being treated. The inner ends of rollers 110 are preferably adjusted closer to the shank of collar 111 than as shown in Fig. 6, as the spacing has been exaggerated for clarity of illustration, the preferred clearance being such that the collar 111 and upper center 12 are maintained in accurate alignment, but the friction produced is kept to a minimum. When a long shaft is to be hardened, the upper center 12 and collar 111 are removed and the shaft extends through the upper support U, either the ends of rollers 110 engaging the shaft, or preferably, the shaft being provided with a collar similar to collar 111 for rotation on rollers 110. As will be evident, shafts up to twice the length of maximum travel of movable support M may be treated, by first hardening one half of the shaft, and then reversing the shaft for hardening of the other half.

The movable support M, on which may be mounted the flame hardening means F, as illustrated in Figs. 1, 7, and 8, may comprise a bracket 113 encircling rod 16 and clamped thereto in a suitable manner as by a set screw, and provided with a mounting ring 114. The flame hardening means F includes one or more blowpipes, each having a head 115 provided with suitable heating flame orifices, as in removable tips 116 which permit a variation in the flame pattern, and mounted on the inner end of a barrel 117. A combustible mixture of oxygen and acetylene is supplied to the barrel by a hose or flexible conduit 118, and cooling water is supplied from a hose or flexible conduit 119, being circulated through the barrel and to the head. Water for quenching the heated surface may be discharged from suitable outlets in blowpipe heads 115, but preferably is discharged through quench heads 120, having inclined inner faces 120' and correspondingly inclined quench outlets, for discharging the quenching liquid at an angle away from the heating flames. Each quench head 120 is mounted at the inner end of a tube 121, quenching liquid being supplied through a hose 122. Quench head 120 is adjustably attached to blowpipe head 115, as by a wing nut and bolt 123, the bolt depending from blowpipe head 115 and disposed in a longitudinal slot in quench head 120. Both barrel 115 of each blowpipe and corresponding tube 121 of the quenching device are slidably mounted in a block 124, which is attached to ring 114, as by a bolt or the like, ring 114 preferably being provided with a series of holes equal in number to the maximum number of mounting blocks 124 to be attached thereto. A collar 125 connects each blowpipe barrel 115 with an adjusting screw 126, which is adapted to threadedly engage a split nut 127 which is mounted for sliding movement in a slot 128 at the upper end of block 124 and which may be moved into and out of engagement with screw 126 by a screw 129.

As will be evident, the quench tube 121 slides in block 124 whenever an adjustment of the blowpipe barrel 117 is made. By lifting split nut 127, a quick adjustment of the blowpipe head may be made to a desired general position, while a finer adjustment may be made by screw 126 after split nut 127 is lowered. The blowpipe heads 115 and quenching heads 120 may be adjusted from a position relatively close to the center of ring 114, as in Fig. 7, to accommodate a shaft or the like of relatively small diameter, or to positions further outwardly, as in Fig. 1, to accommodate a shaft or roll of medium diameter, or still further outwardly to an extreme outward position, to accommodate a roll having a diameter almost as great as that of ring 114. Also, only one blowpipe may be mounted on ring 114, as in Fig. 16, and the number may be varied in accordance with the work to be treated.

Directing the quenching jets at an angle away from the heating flames tends to produce less interference with the heating flames, and also permits a slight soaking period to produce a more even heating effect. If desired, provision may be made for adjustment of a quench head 120 to a different vertical position with respect to the corresponding blowpipe head 115, but radial adjustment is usually all that is necessary, particularly since the angle of the quenching jets is such that radial movement of a quench head 120 will cause the spacing between the points of impingement of the heating flames and quenching jets to be varied vertically on the work. The blowpipe heads 115 may be rhomboidal in shape, so that two heads may be placed relatively close together, as in Fig. 12, and the heating effect of the flames will tend to overlap, thus reducing the tendency for striations in the hardness pattern to be produced, particularly when hardening by the progressive method.

The oxy-acetylene mixture is formed in a conventional manner, as in mixers 130 mounted on brackets 131, as in Fig. 7, and supplied from valves 30 and 31 with the respective gases by hoses 132, as in Figs. 4 and 7. Each mixer 130 is connected by a pipe 133 with a header 134, mounted beneath ring 114, as in Fig. 8, each header 134 being merely a multiple outlet block for supplying the combustible mixture to any desired number of blowpipes through hoses 118, there being any desired number of headers in accordance with the number of blowpipes. Thus, one header will supply three blowpipes, but less when convenient for positioning purposes, i. e., there is preferably at least one header on each side of ring 114 when there are blowpipes on each side of the ring, with outlets not in use being plugged, as in Fig. 7. A ring-shaped cooling water header 135, and a similar but preferably larger ring-shaped quenching water header 136, may be mounted beneath ring 114 by clamps or other suitable means.

The drive means D, as illustrated in Figs. 1, 9, and 10, is installed principally within a housing 137 having a removable cover, and includes a motor 138 mounted, as in Fig. 9, on a gear casing 139. Motor 138 drives a high speed shaft 140 through a pair of V-belts 141 extending around motor pulley 142 and shaft pulley 143. A triple cluster gear 144 is splined on high speed shaft 140, and is moved by a fork 145, actuated by handle 45, to high, intermediate, and low speed positions. Cluster gear 144 is thereby adapted to engage a low single gear 146, or either set of teeth of a dual high and intermediate gear 147, gears 146 and 147 being keyed on a countershaft 148 and providing a first stage of speed change. A second stage of speed change is provided by single gears 149 and 150, also keyed on countershaft 148 and adapted to selectively engage the two sets of teeth of a dual gear 151, splined on a second countershaft 152 and shifted by a fork 153, in turn actuated by handle 46. To provide a third stage of speed change, a triple cluster gear 154 is also splined on second countershaft 152, and is adapted to be moved selectively to different positions by a fork 155, in turn actuated by handle 47. Triple gear 154 selectively engages either set of teeth of a dual gear 146 or a single gear 157, each keyed to an output shaft 158.

To insure smoothness of operation, forks 145, 153 and 155 may be constructed to slide along a guide rod 159, while high speed shaft 140, each of the countershafts 148 and 152, and output shaft 158, may run in ball bearings 160 and 160'. Also, each handle 45, 46, 47 and 48, as shown for handle 46, may be provided with a spring pressed detent 161, adapted to engage notches 162 in the outside of casing 139, or, if desired, in cover 137, to maintain the forks 145, 153 and 155 and the gears shiftable thereby, in desired positions.

A fourth and optional stage of speed change may be provided by a jaw clutch 164, splined on a driveshaft 165 of Fig. 10 and shiftable by movement of handle 48, operating through a fork 166, into alternative engagement with a direct drive jaw 167 or a speed reduction jaw 168, to provide "High" and "Low" speeds, as indicated in Fig. 9. Direct drive jaw 167 is keyed to output shaft 158, while speed reduction jaw 168 is attached to and rotates with a worm gear 169, driven continuously by a worm 170, at a reduced speed from output shaft 158. The drive from output shaft 158 to worm 170 includes a sprocket pinion 171 keyed to output shaft 158 and driving a sprocket gear 172 through a chain 173; a countershaft 174, to one end of which sprocket gear 172 is keyed; and bevel gears 175 and 175', keyed to the end of shaft 174 and shaft 176 of worm 170, respectively. Worm gear 169 is thereby rotated continuously at a slow speed, and when jaw clutch 164 is in direct drive position—i. e., engaging jaw 167— shaft 165 rotates within worm gear 169. Bevel gears 175 may be of different sizes, as shown, to provide additional speed reduction, although they may be made the same size, and the reduction between shaft 158 and worm 170 may be accomplished entirely between shaft 158 and countershaft 174, as by the relative sizes of pinion 171 and sprocket 172, for which a spur pinion and gear may also be substituted.

The parts comprising the fourth stage of speed change are mounted principally in a housing 177, in which sleeve bearings 178 may be provided for sprocket gear shaft 174 and worm shaft 176, as in Fig. 9, although ball bearings may be utilized, if desired. Also, as in Fig. 10, a pair of sleeve bearings 179 may be provided for drive shaft 165, one being mounted in worm gear 169 and the other in housing 177, while sleeve thrust bearings 180 may be provided for worm gear 169, each being mounted in housing 177.

The drive to work support W is completed by a bevel pinion 181 keyed to the end of drive shaft 165, as in Fig. 10, and meshing with a bevel gear 182 keyed to the lower end of shaft 10 of the work support. Work support W includes a housing 183, having a cap 184 provided with a vertical sleeve bearing 185 and packing gland 186 for shaft 10. Because of the weight— i. e., of shaft 10, bevel gear 182, and the work being treated—a ball thrust bearing 187 is preferably provided at the lower end of shaft 10. Face plate 14 may be threadedly secured to the upper end of shaft 10, the latter being provided with projecting jaws 188 for driving certain attachments, as hereinafter described, while lower center 13 merely rests on face plate 14, and does not engage jaws 188. Cap 184 is also provided with radially spaced lands 189, alternating with the attaching bolts and utilized in supporting an angle drive attachment A of Fig. 12, or the like, in a manner explained later.

As will be evident, to select the desired speed of rotation for shaft 10 of work support W, levers 45 to 47, inclusive, and clutch handle 48 are moved to various positions. It will be noted that with clutch handle 48 moved to the right, or direct drive position, one complete series of speeds, i. e., "High," may be obtained through positioning of levers 45 to 47, while another complete series of slower speeds, i. e., "Low," may be obtained by moving clutch handle 48 to the left, or reduction drive position. Also, when clutch handle 48 is in a center or neutral position, as in Figs. 9 and 10, clutch 164 is disengaged and face plate 14 and/or shaft 10 may be readily rotated, during preliminary or work positioning operations. As will be evident, the permutations of speeds possible with the different positions of the levers— indicated in Fig. 9 as positions 1, 2 and 3 for lever 47, positions 4 and 5 for lever 46, and positions A, B and C for lever 45—together with the two different positions of clutch handle 48, provide a range of speeds which accommodate practically any article to be hardened. It will be understood, of course, that other gearing systems may be used, and also that a variable speed drive may be connected to motor 138, so that an infinite number of speed variations may be obtained.

As an example of the various speeds of rotation of shaft 10 by a machine constructed in accordance with this invention, which of course does not represent all possible examples, the following table is given. In this table, the positions given are those indicated in Fig. 9.

| Low, R. P. M. | Lever Position | | | High, R. P. M. |
|---|---|---|---|---|
| .007 | 3 | 4 | A | 3.1 |
| .009 | 3 | 4 | C | 3.5 |
| .013 | 3 | 4 | B | 5.5 |
| .026 | 1 | 4 | A | 11 |
| .033 | 1 | 4 | C | 14 |
| .047 | 1 | 4 | B | 20 |
| .053 | 2 | 4 | A | 23 |
| .067 | 2 | 4 | C | 29 |
| .081 | 3 | 5 | A | 35 |
| .095 | 2 | 4 | B | 41 |
| .103 | 3 | 5 | C | 44 |
| .145 | 3 | 5 | B | 63 |
| .296 | 1 | 5 | A | 128 |
| .375 | 1 | 5 | C | 162 |
| .531 | 1 | 5 | B | 229 |
| .604 | 2 | 5 | A | 261 |
| .767 | 2 | 5 | C | 331 |
| 1.082 | 2 | 5 | B | 468 |

From the above table, it will be evident that, in the position shown in Fig. 9, i. e., 2–4–B, with clutch handle 48 in the "low" position, the speed of shaft 10 will be 0.095 R. P. M., while with handle 48 in the "high" position, the speed of shaft 10 will be 41 R. P. M. As will be evident, there is a speed range of .007 R. P. M. to 468 R. P. M., which is sufficient to accommodate small shafts or large rolls, and also to spin harden small pitch gears.

Figure 11:
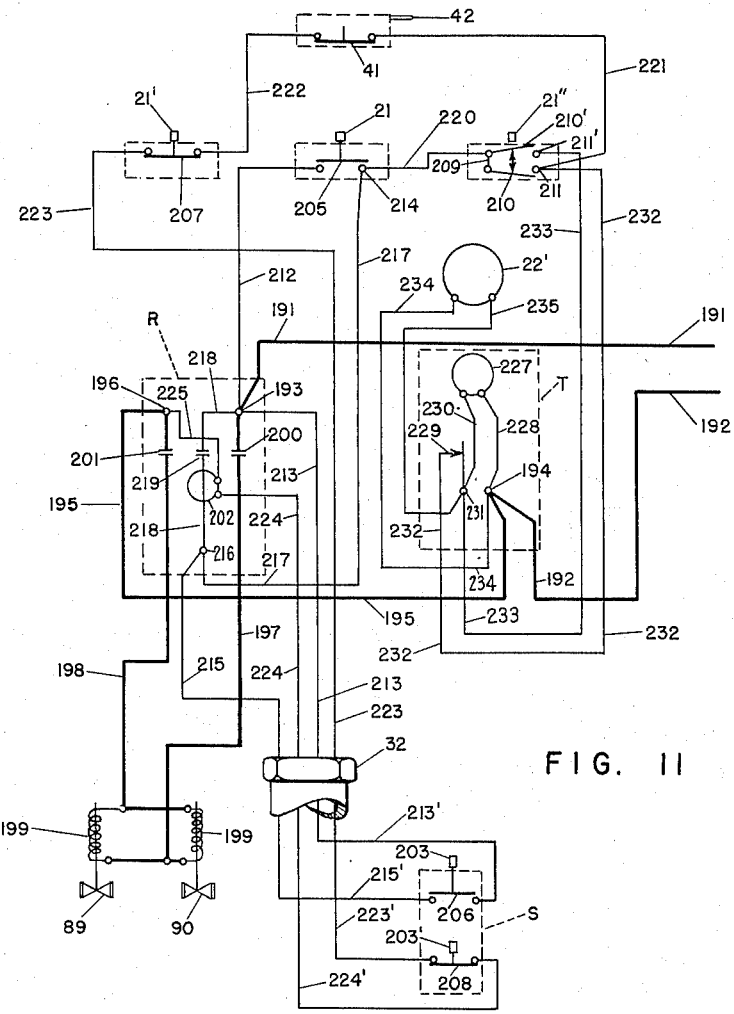
Fig. 11 is a diagram of the electrical circuit of the machine of Fig. 1, including an automatic timer to provide additional control.

For the various hardening operations, suitable electrical control mechanism may be used, such as illustrated diagrammatically in Fig. 11. This circuit may be supplied with suitable current, such as 110-volt, 60 cycle, by wires 191 and 192, the former of which may be connected to a terminal 193 of a two-pole magnetic contactor or relay R, and the latter of which may be connected to a terminal 194 of a timer T, with a wire 195 connecting terminal 194 with a terminal 196 of contactor R.

Through wires 197 and 198, leading respectively from terminals 193 and 196, line current is supplied to the windings 199 of oxygen and acetylene solenoid control valves 89 and 90, under control of contacts 200 and 201 of contactor R, the solenoid windings being connected in parallel for simultaneous operation, as shown. When coil 202 of contactor R is energized, contacts 200 and 201 will close, so that current will flow from line wires 191 and 192 through solenoid windings 199, thus causing valves 89 and 90 to open and the flow of oxygen and acetylene started. Similarly, as soon as contacts 200 and 201 open, through de-energization of coil 202, then the solenoid windings 199 will be de-energized, thus causing valves 89 and 90 to close and shut off the flow of oxygen and acetylene.

The operation of contactor R may be controlled through stop and start push buttons 21 and 21', or by start and stop buttons 203 and 203', respectively, of a portable switch S. If desired, the control of the time of shut off of the oxygen and acetylene may be controlled automatically by timer T, merely by shifting push button 21'' to automatic position. When the operation is to be controlled by hand, the contactor R is not controlled by timer T, but the timer T may be set so that lamp 22' will be lit only during a predetermined time period, of value to the operator for relatively short spin hardening operations, for instance. For progressive or combination operations, wherein the heating flames and quenching jets are traversed upwardly along a shaft, roll, gear tooth or the like, the heating flames are started manually by button, and shut off by means of limit switch 41, or may be shut off by means of stop button 21' or 203', at any time the operator desires.

The control circuit for accomplishing the above includes a normally open, starting switch 205, controlled by button 21; a normally open, portable starting switch 206, controlled by button 203; a normally closed, stop switch 207, controlled by button 21'; a normally closed, portable stop switch 208, controlled by button 203'; and a selector switch 209, controlled by button 22'' and having legs 210 and 210', adapted to close against a manual contact 211 and an automatic contact 211', respectively. Starting switches 205 and 206 are in parallel, so that if either is closed, coil 202 of contactor R will be energized, to close contacts 200 and 201, thus supplying current to solenoid windings 199. Switches 205 and 206 are both connected to terminal 193 of line wire 191, switch 205 by wire 212 and switch 206 by wire 213 and its extension 213', connected thereto at the plug and receptacle 32. The opposite terminal of portable starting switch 206 is also connected to the opposite terminal 214 of starting switch 205 by a wire 215 and its extension 215' at receptacle 32, which, for convenience, is connected to a terminal 216 of contactor R, and a wire 217 which connects terminal 216 with terminal 214 of starting switch 205. Wire 217 also forms a portion of a holding circuit, which includes a wire 218 connecting terminal 216 with terminal 193 of line wire 191, through holding contact 219 of contactor R. As soon as coil 202 is energized and contact 219 closed, starting switches 205 and 206 will be short-circuited, as it were, so that coil 202 will remain energized and contacts 200 and 201 will remain closed, after starting button 21 or 203 is released, and switches 205 and 206 will both be open.

When starting button 21 or 203 is pushed, the starting circuit is completed to terminal 196, connected to line wire 192 by wire 195, as indicated previously, through selector switch 209, limit switch 41, fixed stop switch 207, and portable stop switch 208, which are all normally closed and are connected in series. This circuit, which also comprises the remainder of the holding circuit for manual operation, includes a wire 220, from terminal 214 of starting switch 205 to selector switch 209, the leg 210 of which is, of course, against manual contact 211; a wire 221, from contact 211 to limit switch 41; a wire 222 from limit switch 41 to normally closed stop switch 207; a wire 223 and its extension 223' at receptacle 32, from switch 207 to portable stop switch 208; a wire 224 and its extension 224' at receptacle 32, from portable stop switch 208 to coil 202; and a wire 225, from coil 202 to terminal 196.

As will be evident, when any of stop buttons 21' or 203' are pushed, to open the corresponding stop switch, or when lever 42 is moved to open limit switch 41, the holding circuit will be broken and coil 202 de-energized. This causes the oxygen and acetylene to be shut off, in the manner previously described. When the portable switch S is not utilized, it may be disconnected at receptacle 32, in which case a suitable plug is placed in receptacle 32, to connect wire 223 with wire 224, in view of the elimination of normally closed switch 208, so that the circuit will operate substantially the same as before. Also, when selector switch 209 is shifted so that leg 210 engages automatic contact 211', the operation still may be started by buttons 21 or 203, as described below, but the oxygen and acetylene are automatically shut off at the end of a predetermined time period by timer T.

Timer T includes a synchronous motor 227, connected by a wire 228 with terminal 194 of line wire 192, and in series with a normally closed timing switch or contactor 229, by a wire 230 leading to a terminal 231 of the timing switch. The opposite side of the timing switch is connected by a wire 232 with manual contact 211, and thereby placed in series with limit switch 41 and stop switches 207 and 208, thereby completing the circuit to terminal 196 and line wire 191 in the manner previously indicated. In addition, terminal 230 is connected by a wire 233 with automatic contact 211', so that when either starting button 21 or 203 is pushed, not only will contactor coil 202 be energized, but also synchronous motor 227 will be started. When timer T is set at the beginning of an automatic control operation, timing switch 229 is closed, but is opened when motor 227 reaches a predetermined position. When timing switch 229 opens, the circuit to contactor coil 202 is broken, and the oxygen and acetylene are shut off. Also, the motor 227 stops, since holding contact 219 also opens, thereby shutting off the current to the motor. Limit switch 41 or stop switches 207 or 208 may, of course, be used to stop the operation at any time desired.

Lamp 22' is connected in parallel with motor 227, by wires 234 and 235 to terminals 194 and 231, respectively, so that the lamp is lit during the time the motor 227 is running. Also, when leg 210 of the selector switch is in engagement with contact 211 for manual control, the timer may be reset to close switch 229, in which event motor 227 will start when either starting switch is closed. However, the motor 227 and switch 229 are not in series with the limit and stop switches, and thus control only lamp 22', but when the oxygen and acetylene are controlled manually, it is often advantageous for the incandescent lamp 22' to light for a predetermined time.

Figure 17:
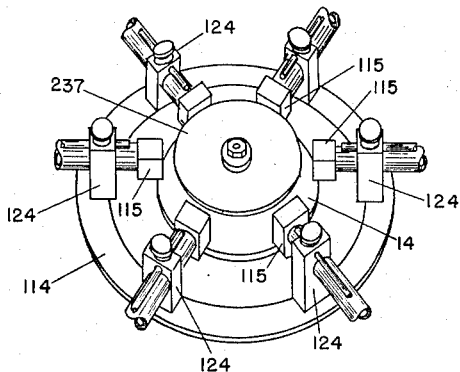
Fig. 17 is a partial three dimensional view illustrating the spin hardening of a small pitch gear by the machine of this invention.

Spin hardening operations may be carried out with a setup similar to that of Fig. 17, wherein a small pitch gear 237 is mounted for rotation on face plate 14; a plurality of torches, such as six, are grouped about the gear, for directing the heating flames from heads 115 against the teeth of the gear 237; and the gear is rotated at a relatively rapid rate, such as 100 to 200 R. P. M. The torch mounting posts 124 are disposed in spaced positions about ring 114, and the torch heads 115 are moved inwardly to a desired position spaced from the gear, so that the inner cones of the heating flames are about ⅛ in. or so from the ends of the gear teeth. The movable support M, in this case, remains stationary, and the quench is not directed against the gear until after the heating flames are turned off. The teeth may be heated for a matter of thirty seconds to one minute, for instance, and the heating flames turned off automatically. Or, if it is desired to turn the heating flames off manually, the timer T may be set, as indicated previously, so that control of the solenoid valves 89 and 90 is manual, but the timer will turn off the incandescent lamp 22' at the end of a pretermined period of time. After heating, the quench may be provided by moving the movable support M upwardly a sufficient distance so that the quenching jets will impinge against the heated gear teeth, at the end of the predetermined heating period. This is readily accomplished by opening globe valve 79 of Fig. 3 through handle 25 of Fig. 1, to cause the quenching jets to move quickly into position. Stop 40', or any other stop, may be set to stop the quenching jets at the desired vertical position.

Indicator timing, with lamp 22', may also be used in other hardening operations, particularly at the start of the hardening of a shaft or roll by the combination method or of a flat surface by the progressive method. Preferably, what may be termed a "standing" start is utilized, wherein the heating flames are applied to the lower end of the surface portion to be hardened, until the surface has reached substantially the critical temperature, whereupon the movable support M is started upwardly, and the heating flames are caused to traverse successive portions of the surface. During such a standing start, the initial surface portion is normally relatively cold, as compared to the critical temperature, but as the initial portion is heated substantially to the critical temperature, the flames traverse upwardly and the heat will tend to run ahead, as it were, to preheat surface portions above. Thus, the time necessary to heat any specific surface portion that has been preheated in such a manner is much less than if such surface portion were heated from a cold condition. Sufficient information has been obtained regarding the times necessary for a standing start for specific sizes of shafts and rolls, and with a specified number of blowpipe heads or tips, as normally measured by gas consumption, that the amount of time spent during the standing start for most articles to be hardened is readily ascertained. Also, in the case of a material or article with which no previous experience has been had, a very slight amount of experimentation will be sufficient to determine the best period of time for a standing start. Thus, if the time required for the standing start is twenty seconds, for instance, the timer T may be set for the period of twenty seconds, but leg 210 of selector switch 209 placed against manual contact 211, so that the timer T will not turn off the oxygen and acetylene at the end of the twenty second period, but will merely turn off the lamp 22'. When one of the starting buttons is pushed, the motor 227 of the timer will begin to turn, and also the solenoid valves 89 and 90 will be opened. As soon as the predetermined period has ended, such as the above period of twenty seconds, the lamp 22' will be turned off, and this will indicate to the operator that the desired standing start period has expired, and the operator then will be able to start the upward movement of movable support M and the flame hardening means F carried thereby, with assurance that the standing start period has been proper and the desired hardness will be obtained.

The above manner of controlling the start of heating may be utilized in connection with the hardening of shafts or rolls, as illustrated in Fig. 1, and also in the hardening of other types of articles, such as the peripheral surface 238 of a roller 239, as in Fig. 12; the hardening of a tooth 240 of a bevel gear 241, as in Fig. 14; the hardening of a tooth 242 of a large spur gear 243, as in Fig. 15; and the hardening of a bearing surface 244 of a guide rail 245, as in Fig. 16. In each instance, the timer T may be set for the standing start time, and the upward movement of traverse of the flame hardening means F started as soon as lamp 22' goes out. It will be understood, of course, that in lieu of lamp 22', a buzzer, horn, or other signal may be utilized, which latter may also be connected in the circuit so as to be turned on at the end of the predetermined time period, rather than being on during the period.

Figure 13:
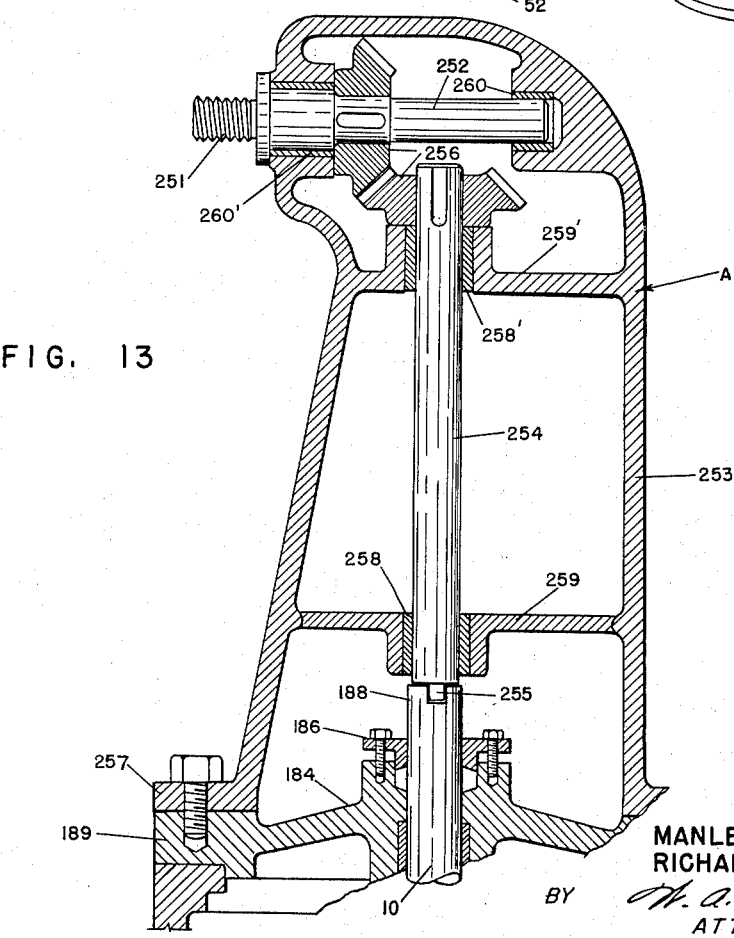
Fig. 13 is a vertical section taken through the angle drive attachment of Fig. 12, along line 13—13, and also illustrates the manner in which the angle drive attachment is mounted on the machine and is driven.

As shown in Fig. 12, roller 239 is rotated in the direction indicated about a horizontal axis, being mounted on an angle drive attachment A, the roller being attached to a face plate 250 which is mounted on threads 251 at the outer end of a horizontal shaft 252, shown in Fig. 13. The angle drive attachment A includes a housing 253, installed on the work support W of Fig. 1 in the manner shown in Fig. 13, and including a vertical shaft 254 having jaws 255 at its lower end engaging jaws 188 of shaft 10, and a set of bevel gears 256 for transmitting the rotative movement of shaft 254 to shaft 252.

The angle drive attachment A rests on cap 184 of work support W, housing 253 being provided with a flange 257 which rests on lands 189 formed atop cap 184, lands 189 being shown also in Fig. 10. The angle drive attachment A may be attached to cap 184 in a suitable manner, as by bolts or cap screws. The upper end of shaft 10 and packing gland 186 extend within housing 253, while bearings 258 and 258' are provided for shaft 254, housing 253 being provided with interior webs 259 and 259' for mounting bearings 258. Shaft 252, in turn, rotates in bearings 260 and 260', mounted in the upper end of housing 253.

The flame hardening means F is mounted on an alternative movable support M', as in Fig. 12, with one or more blowpipe heads 115 disposed side by side and sufficient in number to cover the width of surface 238, the ends of heads 115 being in spaced relation to the surface 238 to be hardened. The quenching heads 120 are disposed immediately below the blowpipe heads 115, and direct jets of quenching water against the successive heated surface portions. The surface 238 is hardened during one revolution of the roller 239, so that the gearing of drive means D is set for a relatively slow speed of rotation, such as to produce a peripheral speed of surface 238 of 6 to 8 inches per minute.

The movable support M′ comprises an inner bar or link 262, adjustably mounted at its inner end on rod 16 by set screws or the like, and provided at its outer end with a plate 263 on which the inner end of an outer bar or link 264 is pivoted. Links 262 and 264 may have any suitable cross-sectional shape, such as inverted channels, and are adapted to be adjusted to any desired lateral position, such as that shown in Fig. 12, or further outwardly or inwardly to accommodate work of various dimensions. Outer link 264 is provided with a slide 265, adjustable by an adjusting screw 261, to adjust the position of a blowpipe rack, consisting of a lower box 266 and an upper bar 267. Box 266 may be open, as shown, the sidewalls thereof being provided with relatively deep slots 268, each adapted to receive a quench tube 121, and generally arcuate slots 269, each adapted to receive a blowpipe barrel 117, each slot 268 being, of course, connected with and having a common vertical centerline with a slot 269. Bar 267 is provided with arcuate slots 270, each adapted to engage the top of a blowpipe barrel 117, and bar 267 is adapted to be clamped thereagainst, as by clamping bolts 271.

When hardening a surface such as surface 238 of roller 239 by the progressive method, the flame hardening means F and the support M′ remain stationary, being set in the desired position. However, when hardening articles in which the flame hardening means F is moved, the movable support M′ is also moved, in the manner previously described.

The flame hardening means F is supplied with a combustible mixture of gases, cooling water and quenching water in a manner similar to that previously described. Thus, an oxyacetylene mixture may be supplied through hoses 118, leading from headers 134, the headers, as well as pipes 133 and mixers 130, being mounted atop inner link 262 of support M′. Hoses 132 lead, of course, from housing H to mixers 130. Cooling water for the blowpipes is supplied through hoses 119 from a manifold 272, while quenching water is supplied to quench tubes 121 by hoses 122 leading from a manifold 273, manifolds 272 and 273 being mounted beneath outer link 264 of support M′ in a suitable manner, as by clamping to a plate 274 welded to the underside of link 264. As shown, outlets of combustible mixture headers 134 not in use are blocked off, as by caps, and manifolds 272 and 273 are similarly provided with a plurality of outlets, with those not in use being blocked off.

In hardening teeth 240 of bevel gear 241, as illustrated in Fig. 14, the hardening operation is carried out with the gear mounted in a stationary position, but with the lowermost tooth 240 thereof disposed vertically and at the lower periphery of the gear. Special gear hardening heads 276 having suitable outlets for discharging heating flames followed by quenching jets against the opposite sides of a tooth are mounted for upward movement with respect to the tooth, on either movable support M or M′. Gear hardening heads 276, also shown in Fig. 15, may be constructed in the manner set forth in U. S. Patent No. 2,224,006 to Roger O. Day.

A special adjustable angle support A′, constructed in accordance with this invention, may be utilized in mounting the gear 241 with its axis disposed at an angle to the horizontal—which is necessary in order to place the lowermost tooth in a vertical position. The adjustable angle support A′ is mounted on face plate 14, which is turned to a suitable position, and then remains stationary. The support A′ includes a spindle 277, at the outer end of an arm 278, gear 241 being clamped to spindle 277 and arm 278 being mounted for pivotal adjustment on the upper end of a vertical standard 279, the latter having a base 280 clamped to face plate 14. A circular dial 281 having angle graduations 282 around a suitable portion of its periphery, is welded or otherwise suitably attached to arm 278, graduations 282 being adapted to register with an indicating mark 283 on standard 279 to indicate the angular position of the axis of spindle 277 with respect to the horizontal. Pivotal adjustment of arm 278 may be obtained by loosening a clamping bolt 284, moving spindle 277 to the angular position desired, and then re-tightening bolt 284.

The heads 276 are preferably maintained with a constant distance therebetween, and any variation in heating effect due to the tapering sides of the tooth may be compensated for by adjustment in the speed of movement of the heads. It will be understood, of course, that during the hardening of the teeth of bevel gear 241, the gear remains stationary in position during the hardening of each tooth. Therefore, shaft 10 of work support W is not rotated, and drive means D is not utilized during such hardening. However, as soon as one tooth has been hardened, and after the gear hardening heads have been returned to a position beneath the lowermost tooth, the gear 241 is turned for a distance of one tooth on spindle 277, to move the next tooth into the lowermost or hardening position.

Gear hardening heads 276 of Fig. 14 also may be mounted on movable support M in a manner similar to that illustrated in Fig. 15, wherein the teeth 242 of a relatively large spur gear 243 are being hardened. Hub 285 of gear 243 is mounted directly on face plate 14 of work support W, and drive means D is not utilized, except that handle 48 is moved to a neutral position, so that jaw clutch 164 will be in a neutral position, such as in the position of Fig. 9, and indexing of gear 243 will be relatively easy. As in the case of bevel gear 241 of Fig. 14, the gear hardening heads 276 of Fig. 15 are moved upwardly past opposite sides of the tooth 242 being hardened, and then returned to a lower position beneath the teeth, whereupon gear 243 is indexed or turned, to present the next tooth for treatment.

As in Fig. 15, the gear hardening heads 276 may be mounted on a special support 286, such as a short section of I-beam, and clamped to one edge of ring 114 of movable support M. Although not all of the connections are shown, mixer 130 and header 134 are attached to the movable support as before, the flexible hoses and conduits for supplying a combustible mixture of gases and cooling and quenching water to the heads 276 being installed in a conventional manner.

As will be evident from Fig. 12, the alternative movable support M′ may be utilized in positioning the gear hardening heads closer to the column C when the teeth of a gear smaller than the relatively large spur gear 243 of Fig. 15 are being hardened, but, as in Fig. 15, for relatively large gears, it may be desirable to remove column C from base B, and place it on the floor at one end of the base. As indicated previously, the weight of control housing H balances the weight of the movable support M and upper center U (the latter not showing in Fig. 15), so that there is little possibility of the column becoming overbalanced. Also, since the gear hardening heads 276 do not touch anything, then the column C may be safely placed directly on a level floor, or specially installed bed plate or other level surface, without bolting or clamping which, however, may be done if desired.

During the hardening of gear teeth, as in Figs. 14 and 15, the heating flames may be turned off automatically at the end of traverse, and the heads 276 automatically returned to a lower position, in the manner described previously. Also, a "standing start" may be utilized, in the manner previously described, wherein the automatic timer is set only to control indicating light 22' of Figs. 1 and 11.

Such a standing start may also be utilized in the hardening of the bearing surface 244 of guide rail 245, as in Fig. 16. The guide rail 245 may be placed on end, atop face plate 14 (which remains stationary) so that the bearing surface 244 is vertical, and the flame hardening means F is moved upwardly in the direction of the arrow, as shown. Depending upon the width of surface 244, any desired number of blowpipes may be utilized, only one blowpipe head 115 provided with a row of tips 116, adapted to direct heating flames across the width of surface 244, being necessary in the instance shown, although additional blowpipes and/or tips may be utilized when necessary. The blowpipe of Fig. 16 is mounted in a block 124, clamped to ring 114 of movable support M, and the oxy-acetylene mixture, cooling water, and quenching water are supplied as described previously.

The ring 114 of the movable support M is positioned to encircle the guide rail 245, and the blowpipe is mounted to extend inwardly toward the surface 244, column C being adjusted to a relatively close inward position, as shown. It will be understood, of course, that for larger guide rails and the like, the blowpipe or blowpipes may be placed in other positions on the movable support M, or the movable support M', shown in Fig. 12, may be utilized in positioning such blowpipes. The shaft 10 of work support W is, of course, not rotated since the guide rail 245 remains stationary, and if more than one guide rail of a similar nature is to be hardened, each guide rail hardened is replaced by the next guide rail to be hardened.

The heating flames may be turned off automatically, or manually, at the upper end of traverse of the flame hardening means F. Also, during hardening, in case heat tends to travel up along the surface, as toward the upper end of traverse, at a faster rate than along lower portions of the surface, the upward movement of support M and flame hardening means F may be increased, as through by-pass valve control 23, of Figs. 1 and 3, in the manner previously described.

In each of the operations carried out by the machine of this invention, the surface to be hardened is placed in a vertical position, and hardening begins at the lower end and proceeds upwardly. This is advantageous, since hardening in an upward direction is more readily controlled, and more uniform results are produced.

As will be evident, the universal flame hardening machine of this invention fulfills to a marked degree the requirements and objects hereinbefore set forth. A large variety of objects and parts differing both in size and shape, may be hardened by the machine of this invention. Also, any desired speed of hardening may be used, while the speed range for parts to be rotated is sufficient to accommodate substantially any size of object. The column C, on one side of which is mounted the housing H, and on the opposite side of which are mounted the movable and stationary supports and other parts, is readily adjusted to different positions, and even may be moved entirely off the base. As indicated previously, when moved off the base, the column still remains balanced, so that the possibility of its tipping over or the like is avoided.

The flame hardening machine of this invention, while primarily adapted to perform the combination and progressive methods, may also be utilized in spot and spin hardening. The number of torches which may be mounted on the supports M or M' may vary from one to a relatively large number, and these torches may be grouped around a roller shaft which is rotated, around a gear whose teeth are to be hardened, or in a position for hardening a surface placed vertically. Also, other types of blowpipes, such as the special gear hardening heads shown in Figs. 14 and 15, may be utilized. In hardening elongated parts to be rotated, such as shafts and rolls, the centering device of this invention insures accurate positioning and maintenance of alignment during rotation. Various phases of the hardening operation may be made automatic, such as the distance traversed, the time of heating for a spin hardening operation, and the time of shut-off of the heating flame. Also, the timing circuit of this invention may be set to indicate to the operator when a predetermined time has elapsed, which is particularly useful for a standing start. The torch adjustment device of this invention also permits quick and accurate positioning of the torches, either grouped about a part to be hardened having a circular cross section, or with the torches extending inwardly or outwardly from the support toward the surface to be hardened. The hydraulic drive for the movable support is easily set and readily controlled, and both long and short objects may be hardened with ease and facility. The speed range of the hydraulic control is particularly adapted to operations wherein the surface to be hardened is in a vertical position, as the flame hardening means may be moved upwardly at a relatively slow rate, but returned downwardly, to the initial position, at a relatively rapid rate. The use of the space in the interior of column C, around tube 55 for piston 54, as a reservoir for hydraulic fluid, both simplifies construction and adds compactness.

The angle drive attachment and the adjustable angle support further enhance the universality of the machine of this invention. By the angle drive attachment, parts such as rollers, sheaves and the like, may be placed for rotation about a horizontal axis, while with the adjustable angle support, parts such as bevel gears or the like, may be placed at any desired angle to the horizontal. These attachments insure that the surface to be hardened can be quickly and easily placed in vertical position.

Although certain specific embodiments of this invention have been described, it will be understood that other embodiments may exist, and that various changes may be made, all without

What is claimed is:

1. Flame hardening apparatus comprising a base, a work support for rotation about an upright axis mounted on the base, means including a first motor for rotating the work support at selected speed, an upright column movable with respect to the base, inner and outer cylinders within said column and defining therewith a reservoir, a piston rod and piston reciprocally sealed in the inner cylinder, a hydraulic pump, a second motor for driving the pump, a valve having an inlet communicating with the pump, and three outlets communicating with the upper and lower ends of the inner cylinder and the reservoir respectively, an adjustable pressure regulating valve between said first mentioned valve and the inner cylinder for regulating the rate of piston travel, and a burner head secured to the piston rod.

2. In flame hardening apparatus of the type having a work support and a burner head, a base for the work support, a variable speed means for rotating the work support, said means including a first motor and gear train coupling the motor to the work support, an upright hollow column slidably mounted on the base for movement towards and away from the work support and containing a reservoir for hydraulic fluid, a burner head support reciprocally mounted on said column, an upright double acting hydraulic cylinder and piston assembly within said column, rigid means connecting the burner support to the piston for vertical movement parallel to the column, and hydraulic pump means in conductive connection with said reservoir and including a motor for forcing the piston up and down at a desired rate of travel.

MANLEY R. NELSON.
RICHARD S. SHEEHAN.

References Cited in the file of this patent

UNITED STATES PATENTS

| Number | Name | Date |
|---|---|---|
| 1,401,131 | Blackburn | Dec. 27, 1921 |
| 1,699,295 | Keller | Jan. 15, 1929 |
| 1,751,056 | Pfauser | Mar. 18, 1930 |
| 1,799,707 | Schellentrager | Apr. 7, 1931 |
| 2,076,515 | Kinzel | Apr. 6, 1937 |
| 2,102,040 | Slade | Dec. 14, 1937 |
| 2,149,141 | Hunsicker | Feb. 28, 1939 |
| 2,189,460 | Derhammer | Feb. 6, 1940 |
| 2,236,425 | Evleth | Mar. 25, 1941 |
| 2,254,306 | Mott et al. | Sept. 2, 1941 |
| 2,264,752 | Groene | Dec. 2, 1941 |
| 2,318,145 | Emery et al. | May 4, 1943 |
| 2,321,645 | Bishop et al. | June 15, 1943 |
| 2,361,197 | Hallinan | Oct. 24, 1944 |
| 2,367,898 | Spieth | Jan. 23, 1945 |
| 2,387,835 | Day et al. | Oct. 30, 1945 |
| 2,401,833 | Le Tourneau | June 11, 1946 |
| 2,407,230 | Furkert | Sept. 10, 1946 |
| 2,429,776 | Shorter | Oct. 28, 1947 |
| 2,500,989 | Hartley et al. | Mar. 21, 1950 |

FOREIGN PATENTS

| Number | Country | Date |
|---|---|---|
| 346,414 | Great Britain | Apr. 13, 1931 |
| 446,821 | Great Britain | May 2, 1936 |

OTHER REFERENCES

"The Iron Age," February 2, 1939, page 90c.